(12) United States Patent
Wakabayashi

(10) Patent No.: US 8,344,957 B2
(45) Date of Patent: Jan. 1, 2013

(54) MOBILE DEVICE AND RADIO COMMUNICATION PORTION OF MOBILE DEVICE

(75) Inventor: Naoyuki Wakabayashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 328 days.

(21) Appl. No.: 12/844,346

(22) Filed: Jul. 27, 2010

(65) Prior Publication Data

US 2011/0074640 A1    Mar. 31, 2011

(30) Foreign Application Priority Data

Jul. 27, 2009 (JP) ................. 2009-173791

(51) Int. Cl.
*H01Q 1/24* (2006.01)

(52) U.S. Cl. ............ 343/702; 343/850; 455/550.1; 455/575.7

(58) Field of Classification Search ............. 343/702, 343/850, 906; 455/550.1, 575.7
See application file for complete search history.

(56) References Cited

U.S. PATENT DOCUMENTS

| 6,259,929 | B1 | 7/2001 | Kuisma |
| 7,023,389 | B2* | 4/2006 | Demicco et al. ............. 343/702 |
| 7,120,469 | B1 | 10/2006 | Urakawa |
| 2003/0169205 | A1* | 9/2003 | Gioia et al. .................. 343/702 |
| 2008/0007468 | A1 | 1/2008 | Sato et al. |
| 2011/0122028 | A1* | 5/2011 | Saario et al. ................. 343/702 |

FOREIGN PATENT DOCUMENTS

| JP | 9-84100 | A | 3/1997 |
| JP | 3088404 | B2 | 7/2000 |
| JP | 3192216 | B2 | 5/2001 |
| JP | 2002-353842 | A | 12/2002 |
| JP | 2006-319855 | A | 11/2006 |
| JP | 4059605 | B2 | 12/2007 |
| JP | 2008-92273 | A | 4/2008 |
| JP | 4146478 | B2 | 6/2008 |

* cited by examiner

*Primary Examiner* — Hoang V Nguyen
(74) *Attorney, Agent, or Firm* — Crowell & Moring LLP

(57) ABSTRACT

In this mobile device, at least either the selection antenna module or the selection circuit module is so formed as to be incapable of being mounted on the mobile device body when the selection antenna module and the selection circuit module are not matched to each other, and both the selection antenna module and the selection circuit module are so formed as to be capable of being mounted on the mobile device body when the selection antenna module and the selection circuit module are matched to each other.

20 Claims, 5 Drawing Sheets

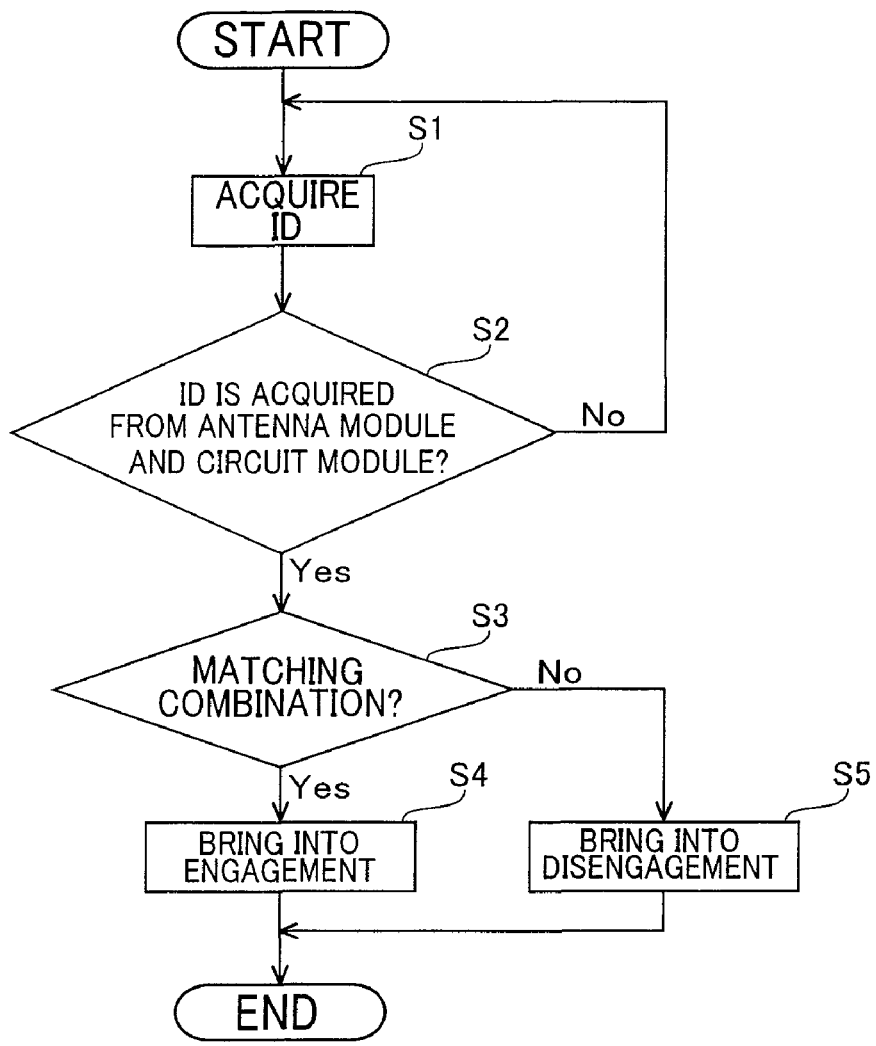

MOBILE DEVICE AND RADIO COMMUNICATION PORTION OF MOBILE DEVICE

BACKGROUND OF THE INVENTION

1. Field of the Invention

The present invention relates to a mobile device and a radio communication portion of a mobile device, and more particularly, it relates to a mobile device capable of corresponding to a plurality of radio communication standards and a radio communication portion of the mobile device.

2. Description of the Background Art

A mobile device capable of corresponding to a plurality of radio communication standards is known in general, as disclosed in Japanese Patent No. 4059605, for example.

The aforementioned Japanese Patent No. 4059605 discloses a mobile communication device comprising a communication device main body and a communication module including radio communication control means for controlling radio communication and an antenna, being detachable with respect to the communication device main body. In this mobile communication device, a communication module corresponding to a desired communication standard is selected from a plurality of communication modules corresponding to different communication standards to be mounted on the communication device main body, whereby radio communication of the desired communication standard is performed.

In the mobile communication device disclosed in the aforementioned Japanese Patent No. 4059605, however, the communication module includes both the radio communication control means and the antenna, and hence the module mounted on the communication device main body disadvantageously increases in size. Thus, when mounting the communication module on the communication device main body, flexibility of arrangement is reduced, and hence it is difficult to arrange the antenna in the communication module in an appropriate position of the communication device main body. Therefore, it is difficult to obtain excellent communication characteristics.

In this regard, a mobile device in which excellent communication characteristics can be obtained by improving flexibility of arrangement of an antenna with respect to a mobile device body is known in general, as disclosed in Japanese Patent Laying-Open No. 2008-092273, for example.

The aforementioned Japanese Patent Laying-Open No. 2008-092273 discloses a mobile phone comprising an antenna module and a mobile phone body including an antenna module receiving portion, wherein the antenna module is detachable on the mobile phone body. In this mobile phone, an antenna module corresponding to a desired communication standard is selected from a plurality of antenna modules corresponding to different communication standards to be mounted on the mobile phone body, whereby radio communication of the desired communication standard is performed. Thus, a mounted module (antenna module) decreases in size, and hence flexibility of arrangement of the antenna module with respect to the mobile phone body is improved as compared with a case where a matching circuit (circuit module) and the antenna module are integrated with each other. Therefore, excellent communication characteristics can be obtained. The mobile phone body disclosed in the Japanese Patent Laying-Open No. 2008-092273 is loaded with a plurality of matching circuits (circuit modules) beforehand in order to correspond to the plurality of antenna modules.

In the mobile phone according to the aforementioned Japanese Patent Laying-Open No. 2008-092273, however, the mobile phone body is loaded with the plurality of matching circuits (circuit modules) beforehand in order to correspond to the plurality of antenna modules, and hence the mobile phone body disadvantageously increases in size.

SUMMARY OF THE INVENTION

The present invention has been proposed in order to solve the aforementioned problems, and an object of the present invention is to provide a mobile device and a radio communication portion of a mobile device in which excellent communication characteristics can be obtained by improving flexibility of arrangement of antenna modules with respect to a mobile device body while the mobile device body is inhibited from increasing in size.

A mobile device according to a first aspect of the present invention comprises a mobile device body, a single selection antenna module mountable on the mobile device body, selected from a plurality of antenna modules corresponding to a plurality of radio communication standards, and a single selection circuit module mountable on the mobile device body, selected from a plurality of circuit modules corresponding to a plurality of radio communication standards, wherein the mobile device body is mounted with a combination of the selection antenna module and the selection circuit module matched to each other in radio communication standards, thereby enabling radio communication of a radio communication standard corresponding to the combination, and at least either the selection antenna module or the selection circuit module is so formed as to be incapable of being mounted on the mobile device body when the selection antenna module and the selection circuit module are not matched to each other, and both the selection antenna module and the selection circuit module are so formed as to be capable of being mounted on the mobile device body when the selection antenna module and the selection circuit module are matched to each other. The "radio communication standard(s)" in the present specification indicates a wide concept including not only radio systems such as GSM, 2G, 3G, WiMAX and PHS but also frequencies employed for radio communication.

As hereinabove described, the mobile device according to the first aspect of the present invention comprises the single selection antenna module mountable on the mobile device body, selected from the plurality of antenna modules corresponding to the plurality of radio communication standards and the single selection circuit module mountable on the mobile device body, selected from the plurality of circuit modules corresponding to the plurality of radio communication standards, whereby a module including an antenna mounted on the mobile device body decreases in size, and hence flexibility of arrangement of the antenna modules with respect to the mobile device body can be improved as compared with a case where the selection circuit module and the selection antenna module are integrated with each other. Thus, the antenna modules can be easily arranged in a position where receiving sensitivity is excellent, and hence excellent communication characteristics can be obtained. The selection circuit module matched to the selection antenna module is selected from the plurality of circuit modules to be mounted on the mobile device body, whereby the mobile device body may not be loaded with the plurality of circuit modules corresponding to the plurality of antenna modules beforehand. Thus, the mobile device body can be inhibited from increasing in size. Therefore, in the mobile device according to the first aspect, excellent communication characteristics can be obtained by improving flexibility of arrangement of the antenna modules with respect to the mobile device body while the mobile device body is inhibited from increasing in size. Further, at least either the selection antenna module or the selection circuit module is so formed as to be incapable of being mounted on the mobile device body when the selection antenna module and the selection circuit module are not matched to each other, and both the selection antenna module and the selection circuit module are so formed as to be capable of being mounted on the mobile device body when the selection antenna module and the selection circuit module are matched in each other, whereby a combination of the selection antenna module and the selection circuit module not matched to each other can be structurally prevented from being mounted on the mobile device body also when the antenna modules and the circuit modules are separated from each other to be capable of being individually mounted on the mobile device body. Thus, violation of laws and regulations can be prevented and a problem with communication caused by the selection antenna module and the selection circuit module not matched to each other can be prevented from occurrence (prescribed communication performance can be prevented from being unsatisfied and a damage of the selection circuit module caused by a reflected wave from the selection antenna module not matched to the selection circuit module can be prevented from occurrence, for example).

In the aforementioned mobile device according to the first aspect, one of either the selection antenna module or the selection circuit module is preferably so formed as to be incapable of being mounted on the mobile device body, and the other of either the selection antenna module or the selection circuit module is preferably so formed as to be capable of being mounted on the mobile device body, when the selection antenna module and the selection circuit module are not matched to each other. According to this structure, a user can easily recognize whether or not the selection antenna module and the selection circuit module are matched to each other by simply confirming whether or not either the selection antenna module or the selection circuit module is capable of being mounted on the mobile device body.

In the aforementioned mobile device according to the first aspect, one of either the selection antenna module or the selection circuit module is preferably not engaged when the selection antenna module and the selection circuit module are not matched to each other and preferably includes a first engaging portion to be engaged when the selection antenna module and the selection circuit module are matched to each other, and the mobile device according to the first aspect preferably further comprises a second engaging portion engaged with the first engaging portion, wherein at least either the selection antenna module or the selection circuit module is so formed as to be incapable of being mounted on the mobile device body when the first engaging portion and the second engaging portion are not engaged with each other, and both the selection antenna module and the selection circuit module are so formed as to be capable of being mounted on the mobile device body when the first engaging portion and the second engaging portion are engaged with each other. According to this structure, when a combination of the selection antenna module and the selection circuit module is not a matching combination, both the selection antenna module and the selection circuit module can be easily structurally prevented from being mounted on the mobile device body by the first and second engaging portions engaged with each other only when a combination of the selection antenna module and the selection circuit module is a matching combination.

In the aforementioned mobile device according to the first aspect, the selection antenna module and the selection circuit module are preferably so formed as to transmit a high-frequency signal to each other without contact when the selection antenna module and the selection circuit module are matched to each other. According to this structure, a high-frequency signal can be easily transmitted between the selection antenna module and the selection circuit module provided separately from each other without using a cable or the like and without contact therebetween.

In this case, the first engaging portion and the second engaging portion preferably include an antenna side engaging portion provided on the selection antenna module and a circuit side engaging portion provided on the selection circuit module respectively, the antenna side engaging portion and the circuit side engaging portion are preferably so formed as not to be engaged with each other when the selection antenna module and the selection circuit module are not matched to each other and are preferably so formed as to be engaged with each other when the selection antenna module and the selection circuit module are matched to each other, and at least either the selection antenna module or the selection circuit module is preferably so formed as to be incapable of being mounted on the mobile device body when the antenna side engaging portion and the circuit side engaging portion are not engaged with each other, and both the selection antenna module and the selection circuit module are preferably so formed as to be capable of being mounted on the mobile device body when the antenna side engaging portion and the circuit side engaging portion are engaged with each other. According to this structure, when a combination of the selection antenna module and the selection circuit module is not a matching combination, both the selection antenna module and the selection circuit module can be easily prevented from being mounted on the mobile device body by simply providing the antenna side engaging portion and the circuit side engaging portion on each of the antenna modules and each of the circuit modules, respectively.

In the aforementioned structure having the antenna side engaging portion and the circuit side engaging portion, each of the antenna side engaging portion and the circuit side engaging portion preferably has a concavo-convex shape, and when the selection antenna module and the selection circuit module are matched to each other, the antenna side engaging portion and the circuit side engaging portion are engaged with each other by fitting the concavo-convex shape of the antenna side engaging portion and the concavo-convex shape of the circuit side engaging portion into each other. According to this structure, each of the antenna side engaging portion and the circuit side engaging portion has the concavo-convex shape having a simple structure, so that both the selection antenna module and the selection circuit module can be prevented from being mounted on the mobile device body when a combination of the selection antenna module and the selection circuit module having the concavo-convex shape having a simple structure is not a matching combination.

In the aforementioned structure having the antenna side engaging portion and the circuit side engaging portion each having the concavo-convex shape, the concavo-convex shape of each of the antenna side engaging portion and the circuit side engaging portion is preferably so formed as to extend in a mounting direction of one of either the selection antenna module or the selection circuit module with respect to the mobile device body, and the antenna side engaging portion and the circuit side engaging portion are preferably so formed that the concavo-convex shape of one of either the antenna side engaging portion or the circuit side engaging portion is slid in the mounting direction with respect to the concavo-convex shape of the other of either the antenna side engaging portion or the circuit side engaging portion to be fitted into the concavo-convex shape of the other of either the antenna side engaging portion or the circuit side engaging portion when the selection antenna module and the selection circuit module are matched to each other. According to this structure, the concavo-convex shapes can be easily fitted into each other to be engaged with each other by simply sliding the concavo-convex shape of one of either the selection antenna module or the selection circuit module with respect to the concavo-convex shape of the other of either the selection antenna module or the selection circuit module.

In the aforementioned structure in which the concavo-convex shapes are so formed as to extend in the mounting direction, one of either the selection antenna module or the selection circuit module is preferably so mounted on the mobile device body that the concavo-convex shape of one of either the antenna side engaging portion or the circuit side engaging portion is slid with respect to the concavo-convex shape of the other of either the antenna side engaging portion or the circuit side engaging portion to be fitted into the concavo-convex shape of the other of either the antenna side engaging portion or the circuit side engaging portion in a state of mounting the other of either the selection antenna module or the selection circuit module on the mobile device body when the selection antenna module and the selection circuit module are matched to each other. According to this structure, when the selection antenna module and the selection circuit module are matched to each other, the concavo-convex shape of one of either the selection antenna module or the selection circuit module is guided by the concavo-convex shape of the other of either the selection antenna module or the selection circuit module already mounted on the mobile device body, and hence one of either the selection antenna module or the selection circuit module can be easily mounted on the mobile device body.

In the aforementioned structure provided with the first and second engaging portions, the second engaging portion preferably includes a body side engaging portion provided in the mobile device body, and the mobile device according to the first aspect preferably further comprises a control portion determining whether or not the selection antenna module and the selection circuit module are matched to each other and controlling the body side engaging portion to move to a position where the first engaging portion and the body side engaging portion do not engage with each other when determining that the selection antenna module and the selection circuit module are not matched to each other and move to a position where the first engaging portion and the body side engaging portion engage with each other when determining that the selection antenna module and the selection circuit module are matched to each other, wherein at least either the selection antenna module or the selection circuit module is so formed as to be incapable of being mounted on the mobile device body when the first engaging portion and the body side engaging portion are not engaged with each other, and both the selection antenna module and the selection circuit module are so formed as to be capable of being mounted on the mobile device body when the first engaging portion and the body side engaging portion are engaged with each other. According to this structure, an engaging state/a disengaging state between the first engaging portion and the body side engaging portion can be easily switched by the control portion.

In the aforementioned structure in which the second engaging portion includes the body side engaging portion provided in the mobile device body, the selection antenna module preferably includes a storage portion storing identification information about which of the plurality of radio communication standards the selection antenna module corresponds to and the selection circuit module preferably includes a storage portion storing identification information about which of the plurality of radio communication standards the selection circuit module corresponds to, and the control portion is preferably so formed as to determine whether or not the selection antenna module and the selection circuit module are matched to each other on the basis of the identification information of the selection antenna module and the selection circuit module. According to this structure, it is not necessary to acquire characteristics of each of the selection antenna module and the selection circuit module using a measuring instrument or the like, and whether or not the selection antenna module and the selection circuit module are matched to each other can be easily determined on the basis of the identification information by the control portion.

In the aforementioned structure in which the second engaging portion includes the body side engaging portion provided in the mobile device body, the first engaging portion preferably includes a recess portion provided on either the selection antenna module or the selection circuit module, the body side engaging portion preferably includes a projecting portion capable of moving by a piston mechanism, and the control portion is preferably so formed as to control the projecting portion to be inserted into the recess portion of either the selection antenna module or the selection circuit module by moving the projecting portion to be engaged with the recess portion when the selection antenna module and the selection circuit module are matched to each other. According to this structure, the projecting portion and the recess portion of either the selection antenna module or the selection circuit module can be easily engaged with each other by moving the projecting portion by the control portion when the selection antenna module and the selection circuit module are matched to each other.

In the aforementioned structure in which the first engaging portion includes the recess portion, the mobile device body preferably includes an urging member urging at least either the selection antenna module or the selection circuit module in a discharging direction from the mobile device body, and at least either the selection antenna module or the selection circuit module is preferably so formed as to be moved in the discharging direction from the mobile device body by urging force generated by the urging member when the first engaging portion and the body side engaging portion are not engaged with each other. According to this structure, when the selection antenna module and the selection circuit module are not matched to each other, at least either the selection antenna module or the selection circuit module is discharged from the mobile device body by the urging member, and hence a combination of the selection antenna module and the selection circuit module not matched to each other can be reliably prevented from being mounted on the mobile device body.

In the aforementioned structure in which the mobile device body includes the urging member, the urging member is preferably a spring member. According to this structure, at least either the selection antenna module or the selection circuit module can be easily discharged from the mobile device body using the spring member having a simple structure when the selection antenna module and the selection circuit module are not matched to each other.

The aforementioned mobile device according to the first aspect preferably further comprises a detection portion detecting that either the selection antenna module or the selection circuit module is not mounted on the mobile device body and a notification portion notifying that a combination of the selection antenna module and the selection circuit module is not a matching combination when the detection portion detects that either the selection antenna module or the selection circuit module is not mounted. According to this structure, a user can easily recognize that the selection antenna module and the selection circuit module are not matched to each other by notification by the notification portion.

In this case, the notification portion preferably includes a speaker outputting an error sound when the selection antenna module and the selection circuit module are not matched to each other. According to this structure, a user can reliably recognize aurally that the selection antenna module and the selection circuit module are not matched to each other.

A radio communication portion of a mobile device according to a second aspect of the present invention comprises a single selection antenna module mountable on a mobile device body, selected from a plurality of antenna modules corresponding to a plurality of radio communication standards and a single selection circuit module mountable on the mobile device body, selected from a plurality of circuit modules corresponding to a plurality of radio communication standards, wherein a combination of the selection antenna module and the selection circuit module matched to each other in radio communication standards is mounted on the mobile device body, thereby enabling radio communication of a radio communication standard corresponding to the combination mounted on the mobile device body, and at least either the selection antenna module or the selection circuit module is so formed as to be incapable of being mounted on the mobile device body when the selection antenna module and the selection circuit module are not matched to each other, and both the selection antenna module and the selection circuit module are so formed as to be capable of being mounted on the mobile device body when the selection antenna module and the selection circuit module are matched to each other. The "radio communication standard(s)" in the present specification indicates a wide concept including not only radio systems such as GSM, 2G, 3G, WiMAX and PHS but also frequencies employed for radio communication.

As hereinabove described, the radio communication portion of a mobile device according to the second aspect of the present invention comprises the single selection antenna module mountable on the mobile device body, selected from the plurality of antenna modules corresponding to the plurality of radio communication standards and the single selection circuit module mountable on the mobile device body, selected from the plurality of circuit modules corresponding to the plurality of radio communication standards, whereby a module including an antenna mounted on the mobile device body decreases in size, and hence flexibility of arrangement of the antenna modules with respect to the mobile device body can be improved as compared with a case where the selection circuit module and the selection antenna module are integrated with each other. Thus, the antenna modules can be easily arranged in a position where receiving sensitivity is excellent, and hence excellent communication characteristics can be obtained. The selection circuit module matched to the selection antenna module is selected from the plurality of circuit modules to be mounted on the mobile device body, whereby the mobile device body may not be loaded with the plurality of circuit modules corresponding to the plurality of antenna modules beforehand. Thus, the mobile device body can be inhibited from increasing in size. Therefore, excellent communication characteristics can be obtained by improving flexibility of arrangement of the antenna modules with respect to the mobile device body while the mobile device body is inhibited from increasing in size by employing the radio communication portion of a mobile device according to the second aspect. Further, at least either the selection antenna module or the selection circuit module is so formed as to be incapable of being mounted on the mobile device body when the selection antenna module and the selection circuit module are not matched to each other, and both the selection antenna module and the selection circuit module are so formed as to be capable of being mounted on the mobile device body when the selection antenna module and the selection circuit module are matched in each other, whereby a combination of the selection antenna module and the selection circuit module not matched to each other can be structurally prevented from being mounted on the mobile device body also when the antenna modules and the circuit modules are separated from each other to be capable of being individually mounted on the mobile device body. Thus, violation of laws and regulations can be prevented and a problem with communication caused by the selection antenna module and the selection circuit module not matched to each other can be prevented from occurrence (prescribed communication performance can be prevented from being unsatisfied and a damage of the selection circuit module caused by a reflected wave from the selection antenna module not matched to the selection circuit module can be prevented from occurrence, for example).

In the aforementioned radio communication portion of a mobile device according to the second aspect, one of either the selection antenna module or the selection circuit module is preferably not engaged when the selection antenna module and the selection circuit module are not matched to each other and preferably includes a first engaging portion to be engaged when the selection antenna module and the selection circuit module are matched to each other, and the radio communication portion of a mobile device according to the second aspect preferably further comprises a second engaging portion engaged with the first engaging portion, wherein at least either the selection antenna module or the selection circuit module is so formed as to be incapable of being mounted on the mobile device body when the first engaging portion and the second engaging portion are not engaged with each other, and both the selection antenna module and the selection circuit module are so formed as to be capable of being mounted on the mobile device body when the first engaging portion and the second engaging portion are engaged with each other. According to this structure, when a combination of the selection antenna module and the selection circuit module is not a matching combination, both the selection antenna module and the selection circuit module can be easily structurally prevented from being mounted on the mobile device body by the first and second engaging portions engaged with each other only when a combination of the selection antenna module and the selection circuit module is a matching combination.

In the aforementioned radio communication portion of a mobile device according to the second aspect, the selection antenna module and the selection circuit module are preferably so formed as to transmit a high-frequency signal to each other without contact when the selection antenna module and the selection circuit module are matched to each other. According to this structure, a high-frequency signal can be easily transmitted between the selection antenna module and the selection circuit module provided separately from each other without using a cable or the like and without contact therebetween.

In the aforementioned structure having the first and second engaging portions, the first engaging portion and the second engaging portion preferably include an antenna side engaging portion provided on the selection antenna module and a circuit side engaging portion provided on the selection circuit module respectively, the antenna side engaging portion and the circuit side engaging portion are preferably so formed as not to be engaged with each other when the selection antenna module and the selection circuit module are not matched to each other and are preferably so formed as to be engaged with each other when the selection antenna module and the selection circuit module are matched to each other, and at least either the selection antenna module or the selection circuit module is preferably so formed as to be incapable of being mounted on the mobile device body when the antenna side engaging portion and the circuit side engaging portion are not engaged with each other, and both the selection antenna module and the selection circuit module are preferably so formed as to be capable of being mounted on the mobile device body when the antenna side engaging portion and the circuit side engaging portion are engaged with each other. According to this structure, when a combination of the selection antenna module and the selection circuit module is not a matching combination, both the selection antenna module and the selection circuit module can be easily prevented from being mounted on the mobile device body by simply providing the antenna side engaging portion and the circuit side engaging portion on each of the antenna modules and each of the circuit modules, respectively.

In the aforementioned structure having the first and second engaging portions, the mobile device body is preferably provided with a body side engaging portion as the second engaging portion and a control portion determining whether or not the selection antenna module and the selection circuit module are matched to each other and controlling the body side engaging portion to move to a position where the first engaging portion and the body side engaging portion do not engage with each other when determining that the selection antenna module and the selection circuit module are not matched to each other and move to a position where the first engaging portion and the body side engaging portion engage with each other when determining that the selection antenna module and the selection circuit module are matched to each other, and at least either the selection antenna module or the selection circuit module is preferably so formed as to be incapable of being mounted on the mobile device body when the first engaging portion and the body side engaging portion are not engaged with each other, and both the selection antenna module and the selection circuit module are preferably so formed as to be capable of being mounted on the mobile device body when the first engaging portion and the body side engaging portion are engaged with each other. According to this structure, an engaging state/a disengaging state between the first engaging portion and the body side engaging portion can be easily switched.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a flow chart for illustrating matching determination processing and engagement control processing of the mobile phone according to the second embodiment of the present invention.

DESCRIPTION OF THE PREFERRED EMBODIMENTS

Embodiments of the present invention are now described with reference to the drawings.

First Embodiment

First, the structure of a mobile phone 100 according to a first embodiment of the present invention is described with reference to FIGS. 1 to 5. The mobile phone 100 is an example of the "mobile device" in the present invention.

Figure 1:
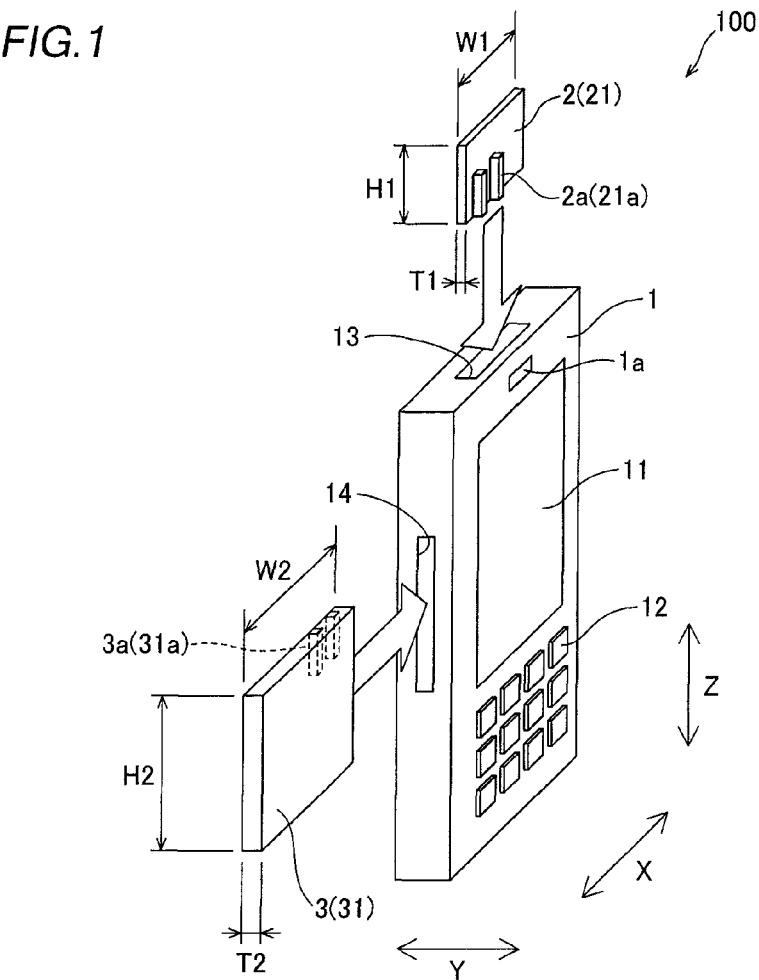
FIG. 1 is a perspective view showing the overall structure of a mobile phone according to a first embodiment of the present invention.

The mobile phone 100 according to the first embodiment of the present invention comprises a mobile device body 1, a single selection antenna module 21 selected from a plurality of antenna modules 2 corresponding to a plurality of radio systems (an example of a radio communication standard) (GSM, 3G and WiMAX, for example) and a single selection circuit module 31 selected from a plurality of circuit modules 3 corresponding to a plurality of radio systems (GSM, 3G and WiMAX, for example), as shown in FIG. 1. According to the first embodiment, the antenna modules 2 and the circuit modules 3 are individually provided with respect to each of radio systems. The mobile phone 100 is mounted with a combination of the selection antenna module 21 and the selection circuit module 31 matched to each other in the radio systems, thereby enabling radio communication of a radio system corresponding to the combination. According to the first embodiment, each of the antenna modules 2 and each of the circuit modules 3 are so formed as to correspond to one of the radio systems. A radio communication portion constituted by the selection antenna module 21 and the selection circuit module 31 is an example of the "radio communication portion of a mobile device" in the present invention.

Figure 2:
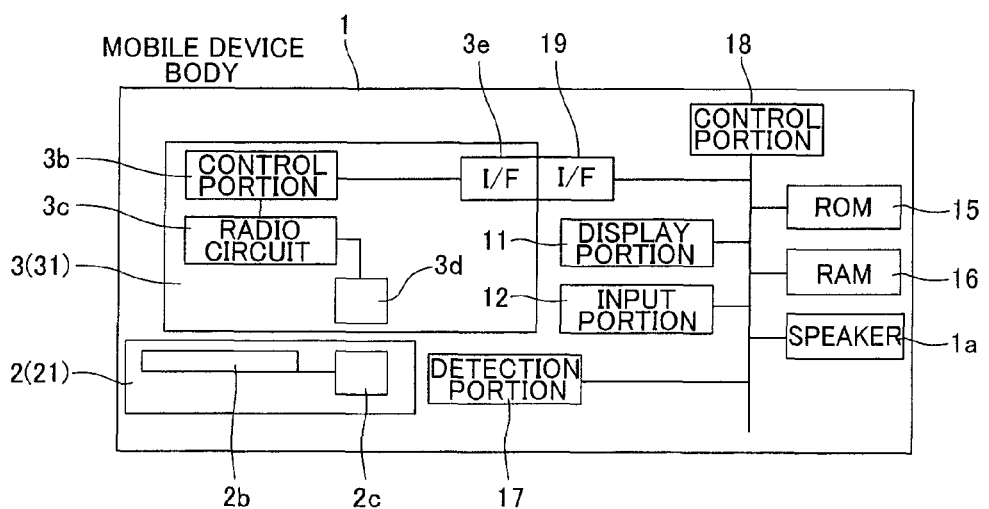
FIG. 2 is a block diagram showing the overall structure of the mobile phone according to the first embodiment of the present invention.

The mobile device body 1 has a display portion 11 constituted by a liquid crystal display, provided on a front surface thereof, an input portion 12 constituted by a plurality of buttons, provided on the front surface thereof, a receiving portion 13 receiving the selection antenna module 21, provided on an upper surface thereof and a receiving portion 14 receiving the selection circuit module 31, provided on a side surface thereof, as shown in FIG. 1. A ROM 15, a RAM 16, a reflective detection portion 17 detecting that the selection antenna module 21 is not mounted on the mobile device body 1 and a control portion 18 controlling each part of the mobile device body 1 are provided in the mobile device body 1, as shown in FIG. 2. The detection portion 17 may be not only an optical sensor but also a mechanical switch.

The ROM 15 stores a processing program for executing various functions such as a telephone function, an e-mail function, an Internet function and so on.

The RAM 16 is employed to readout the processing program stored in the ROM 15. Further, the RAM 16 is employed as a work area of the control portion 18 at the execution of the processing program.

The detection portion 17 has a function of detecting that the selection antenna module 21 is not mounted on the mobile device body 1 after mounting the selection circuit module 31 on the mobile device body 1.

The control portion 18 is provided to execute the processing program stored in the ROM 15 and loaded by the RAM 16. The control portion 18 can communicate with the selection circuit module 31 mounted on the mobile device body 1 through an interface 19. The control portion 18 controls each part to output an error sound from a speaker 1a (see FIGS. 1 and 2) when the detection portion 17 detects that the selection antenna module 21 is not mounted on the mobile device body 1. In other words, as described later, a user is notified by the error sound that the selection antenna module 21 and the selection circuit module 31 are not matched to each other when the selection antenna module 21 cannot be mounted on the mobile device body 1 by not matching the selection antenna module 21 and the selection circuit module 31 to each other. The speaker 1a and the control portion 18 are examples of the "notification portion" in the present invention.

According to the first embodiment, each of the antenna modules 2 (selection antenna module 21) has a height H1 of about 10 mm, a width W1 of about 25 mm and a thickness T1 of about 1 mm, and each of the antenna modules 2 is formed to be smaller than each of the circuit modules 3 (selection circuit module 31) as described later. Each of the antenna modules 2 (selection antenna module 21) has projecting portions 2a (21a) each formed in a specified shape corresponding to one of the radio systems. For example, the selection antenna module 21 shown in FIG. 1 has two projecting portions 21a extending vertically (in a direction Z) on a front surface thereof. Each of the two projecting portions 21a of the selection antenna module 21 has a square pole shape extending vertically. The projection portion 2a (21a) is examples of the "first engaging portion" and the "antenna side engaging portion" in the present invention.

Figure 3:
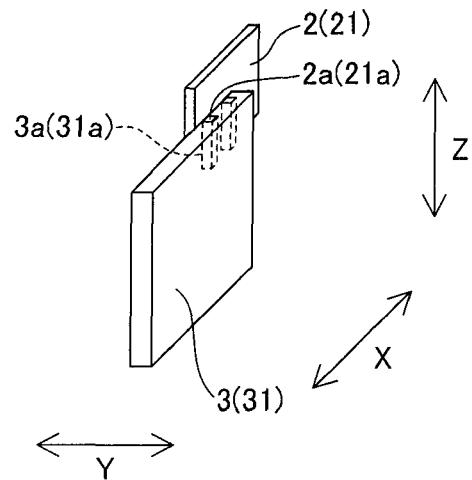
FIG. 3 is a perspective view showing a mounting state between a selection antenna module and a selection circuit module of the mobile phone according to the first embodiment of the present invention.
Figure 4:
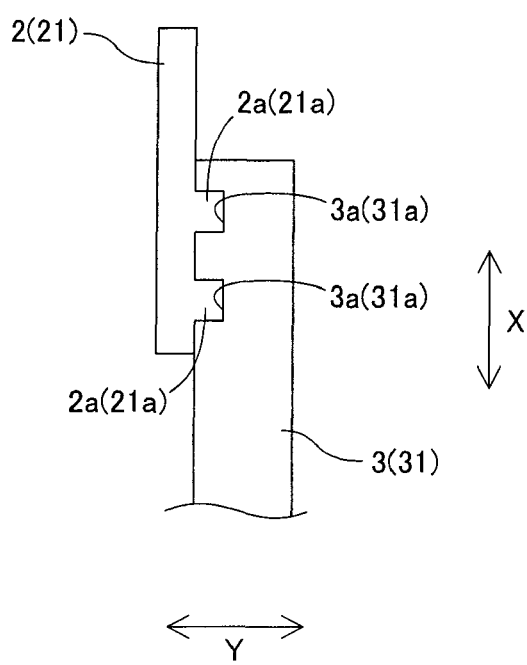
FIG. 4 is a plan view showing an engaging state between the selection antenna module and the selection circuit module of the mobile phone according to the first embodiment of the present invention.
Figure 5:
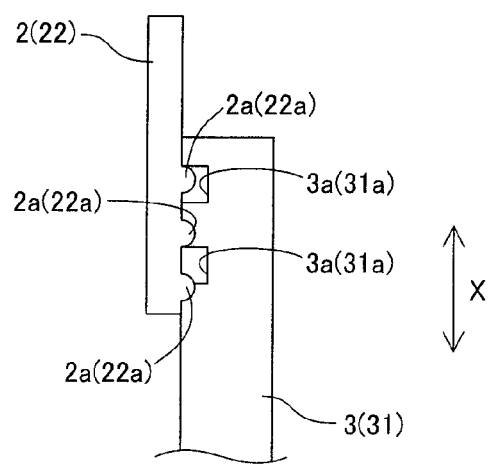
FIG. 5 is a plan view showing a disengaging state between the selection antenna module and the selection circuit module of the mobile phone according to the first embodiment of the present invention.

The selection antenna module 21 is mounted on the mobile device body 1 by being inserted from the receiving portion 13 provided on the upper surface of the mobile device body 1 after mounting the selection circuit module 31 on the mobile device body 1. The selection antenna module 21 is inserted into the mobile device body 1 along a back surface of the selection circuit module 31 first mounted on the mobile device body 1, as shown in FIGS. 3 and 4. Specifically, the selection antenna module 21 is inserted along the back surface of the selection circuit module 31 when the projecting portions 21a are fitted into recess portions 31a of the selection circuit module 31 described later (when the shapes of the projecting portions 21a correspond to the shapes of the recess portions 31a) as shown in FIG. 4. The selection antenna module 21 is not inserted into the mobile device body 1 when projecting portions 22a are not fitted into the recess portions 31a of the selection circuit module 31 described later (when the shapes of the projecting portions 22a do not correspond to the shapes of the recess portions 31a) as shown in FIG. 5. In other words, when the projecting portions 22a are not fitted into the recess portions 31a (when the selection antenna module and the selection circuit module are not matched to each other), a selection antenna module 22 cannot be inserted into the mobile device body 1.

As shown in FIG. 2, an antenna element 2b for radio waves and a coupling terminal 2c for electrostatic coupling enabling transmission of a high-frequency signal are provided in each of the antenna modules 2 (selection antenna module 21). The coupling terminal 2c is connected to the antenna element 2b. The coupling terminal 2c is arranged at a position opposed to a coupling terminal 3d of the selection circuit module 31 described later at a prescribed interval when both the selection antenna module 21 and the selection circuit module 31 are mounted on the mobile device body 1. The coupling terminal 2c can be electrostatically coupled to the coupling terminal 3d of the selection circuit module 31. Thus, when both the selection antenna module 21 and the selection circuit module 31 are mounted on the mobile device body 1, a high-frequency signal can be transmitted without contact between the selection antenna module 21 and the selection circuit module 31.

Each of the circuit modules 3 (selection circuit module 31) has a height H2 of about 30 mm, a width W2 of about 30 mm and a thickness T2 of about 3 mm and is larger than each of the antenna modules 2 (selection antenna module 21). This is because each of the antenna modules 2 (selection antenna module 21) only includes components, which are easily downsized, such as the antenna element 2b and the coupling terminal 2c whereas each of the circuit modules 3 (selection circuit module 31) includes components, which are not easily downsized, such as a control portion 3b and a radio circuit 3c, as described later. Each of the circuit modules 3 (selection circuit module 31) has the recess portions 3a (31a) each formed in a specified shape corresponding to one of the radio systems. For example, the selection circuit module 31 shown in FIG. 1 has two groove-shaped recess portions 31a extending vertically (in the direction Z) on the back surface thereof. Each of the two recess portions 31a of the selection circuit module 31 has a dent in a square pole shape extending vertically. The selection circuit module 31 is mounted on the mobile device body 1 by being inserted from the receiving portion 14 provided on the side surface of the mobile device body 1 before inserting the selection antenna module 21 into the mobile device body 1. The recess portion 3a (31a) is examples of the "second engaging portion" and the "circuit side engaging portion" in the present invention.

As hereinabove described, the specified projecting portions 2a and the specified recess portions 3a corresponding to one of the radio systems are provided on the antenna modules 2 and the circuit modules 3 respectively, whereby the projecting portions 2a of the antenna modules 2 and the recess portions 3a of the circuit modules 3 are fitted into each other to be engaged with each other when radio systems corresponding to the projecting portions and the recess portions are common (when the convex and concave shapes of the projecting and recess portions correspond to each other). On the other hand, the projecting portions 2a of the antenna modules 2 and the recess portions 3a of the circuit modules 3 are not fitted into each other not to be engaged with each other when the radio systems corresponding to the projecting portions and the recess portions are different (when the convex and concave shapes of the projecting and recess portions do not correspond to each other). In other words, in a case where a combination of the selection antenna module 21 and the selection circuit module 31 is a matching combination in the radio systems, the projecting portions 21*a* of the selection antenna modules 21 and the recess portions 31*a* of the selection circuit modules 31 are fitted into each other to be engaged with each other by inserting the selection antenna module 21 into the mobile device body 1 from the receiving portion 13 after mounting the selection circuit module 31 on the mobile device body 1, as shown in FIGS. 3 and 4. In a case where a combination of the selection antenna module 22 and the selection circuit module 31 is not a matching combination in the radio systems as shown in FIG. 5, on the other hand, the semicircular column-shaped projecting portions 22*a* are not fitted into the rectangular column-shaped recess portions 31*a* not to be engaged therewith, and hence the selection antenna module 22 cannot be inserted into the mobile device body 1.

The control portion 3*b*, the radio circuit 3*c* and the coupling terminal 3*d* for electrostatic coupling enabling transmission of a high-frequency signal are provided in each of the circuit modules 3 (selection circuit module 31) as shown in FIG. 2.

The control portion 3*b* is connected to the mobile device body 1 to be capable of communicating therewith through an interface 3*e* when mounting the selection circuit module 31 on the mobile device body 1. Further, the control portion 3*b* is connected to the radio circuit 3*c* and can communicate with the radio circuit 3*c*. Thus, the control portion 3*b* can transmit an instruction from the mobile device body 1 to the radio circuit 3*c* and transmit a signal from the radio circuit 3*c* to the mobile device body 1.

The radio circuit 3*c* can transmit and receive various signals (sound signals and picture signals, for example) through the antenna element 2*b* of the selection antenna module 21.

The coupling terminal 3*d* is connected to the radio circuit 3*c*. When mounting both the selection antenna module 21 and the selection circuit module 31 on the mobile device body 1, the coupling terminal 3*d* can be electrostatically coupled to the coupling terminal 2*c* of the selection antenna module 21. Thus, in the mobile phone 100 according to the first embodiment, the selection antenna module 21 and the selection circuit module 31 matched to each other in the radio systems are both mounted on the mobile device body 1, whereby radio communication of a radio system corresponding to a combination of the selection antenna module 21 and the selection circuit module 31 is enabled.

According to the first embodiment, as hereinabove described, the mobile phone 100 comprises the single selection antenna module 21 mountable on the mobile device body 1, selected from the plurality of antenna modules 2 corresponding to the plurality of radio systems and the single selection circuit module 31 mountable on the mobile device body 1, selected from the plurality of circuit modules 3 corresponding to the plurality of radio systems, whereby a module including an antenna mounted on the mobile device body 1 decreases in size, and hence flexibility of arrangement of the antenna modules 2 with respect to the mobile phone body 1 can be improved as compared with a case where the selection circuit module 31 and the selection antenna module 21 are integrated with each other. Thus, the antenna modules 2 can be easily arranged in a position where receiving sensitivity is excellent, and hence excellent communication characteristics can be obtained. The selection circuit module 31 matched to the selection antenna module 21 is selected from the plurality of circuit modules 3 to be mounted on the mobile device body 1, whereby the mobile device body 1 may not be loaded with the plurality of circuit modules 3 corresponding to the plurality of antenna modules 2 beforehand. Thus, the mobile device body 1 can be inhibited from increasing in size. Therefore, excellent communication characteristics can be obtained by improving flexibility of arrangement of the antenna modules 2 with respect to the mobile phone body 1 while the mobile device body 1 is inhibited from increasing in size.

According to the first embodiment, at least either the selection antenna module 21 or the selection circuit module 31 is so formed as to be incapable of being mounted on the mobile device body 1 when the selection antenna module 21 and the selection circuit module 31 are not matched to each other, and both the selection antenna module 21 and the selection circuit module 31 are so formed as to be capable of being mounted on the mobile device body 1 when the selection antenna module 21 and the selection circuit module 31 are matched in each other, whereby a combination of the selection antenna module 21 and the selection circuit module 31 not matched to each other can be structurally prevented from being mounted on the mobile device body 1 also when the antenna modules 2 and the circuit modules 3 are separated from each other to be capable of being individually mounted on the mobile device body. Thus, violation of laws and regulations can be prevented and a problem with communication caused by the selection antenna module 21 and the selection circuit module 31 not matched to each other can be prevented from occurrence (prescribed communication performance can be prevented from being unsatisfied and a damage of the selection circuit module 31 caused by a reflected wave from the selection antenna module 21 not matched to the selection circuit module 31 can be prevented from occurrence, for example).

According to the first embodiment, the projecting portions 2*a* (21*a*) formed in a specified shape corresponding to one of the radio systems are provided on each of the antenna modules 2 (21), the recess portions 3*a* (31*a*) formed in a specified shape corresponding to the radio system are provided on each of the circuit modules 3 (31), the projecting portions 2*a* (21*a*) and the recess portions 3*a* (31*a*) are so formed as not to be engaged with each other when the selection antenna module 21 and the selection circuit module 31 are not matched to each other, and the projecting portions 2*a* (21*a*) and the recess portions 3*a* (31*a*) are so formed as to be engaged with each other when the selection antenna module 21 and the selection circuit module 31 are matched to each other, whereby the antenna modules 2 (21) and the circuit modules 3 (31) have the projecting portions 2*a* (21*a*) and the recess portions 3*a* (31*a*) each having a simple structure, engaged with each other only when a combination of the selection antenna module 21 and the selection circuit module 31 is a matching combination, so that both the selection antenna module 21 and the selection circuit module 31 can be prevented from being mounted on the mobile device body 1 when a combination of the selection antenna module 21 and the selection circuit module 31 having the projecting portions 2*a* (21*a*) and the recess portions 3*a* (31*a*) each having a simple structure is not a matching combination.

According to the first embodiment, the reflective detection portion 17 detecting that the selection antenna module 21 is not mounted on the mobile device body 1 and the control portion 18 notifying by the error sound that a combination of the selection antenna module 21 and the selection circuit module 31 is not a matching combination and the selection antenna module 21 cannot be mounted on the mobile device body 1 when the detection portion 17 detects that the selection antenna module 21 is not mounted on the mobile device body 1 are provided, whereby a user can easily recognize by the error sound that the selection antenna module 21 and the selection circuit module 31 are not matched to each other.

According to the first embodiment, when the selection antenna module 21 and the selection circuit module 31 are not matched to each other, the selection antenna module 21 is so formed as to be incapable of being mounted on the mobile device body 1 and the selection circuit module 31 is so formed as to be capable of being mounted on the mobile device body 1, whereby a user can easily recognize whether or not the selection antenna module 21 and the selection circuit module 31 are matched to each other by simply confirming whether or not the selection antenna module 21 is capable of being mounted on the mobile device body 1.

According to the first embodiment, the selection antenna module 21 and the selection circuit module 31 are formed such that a high-frequency signal can be transmitted without contact therebetween when the selection antenna module 21 and the selection circuit module 31 are matched to each other, whereby a high-frequency signal can be easily transmitted between the selection antenna module 21 and the selection circuit module 31 provided separately from each other without using a cable or the like and without contact therebetween.

According to the first embodiment, the projecting portions 2a (21a) of each of the antenna modules 2 (21) and the recess portions 3a (31a) of each of the circuit modules 3 (31) are so formed as to extend in a mounting direction (direction Z) of the selection antenna module 21 with respect to the mobile device body 1, and the projecting portions 2a (21a) are slid in a mounting direction with respect to the recess portions 3a (31a) to be fitted thereinto when the selection antenna module 21 and the selection circuit module 31 are matched to each other, whereby the projecting portions 2a (21a) and the recess portions 3a (31a) can be easily fitted into each other to be engaged with each other by simply sliding the projecting portions 2a (21a) with respect to the recess portions 3a (31a).

According to the first embodiment, when the selection antenna module 21 and the selection circuit module 31 are matched to each other, the selection antenna module 21 is so mounted on the mobile device body 1 that the projecting portions 21a are slid with respect to the recess portions 31a to be fitted thereinto in a state of mounting the selection circuit module 31 on the mobile device body 1, whereby when the selection antenna module 21 and the selection circuit module 31 are matched to each other, the projecting portions 21a of the selection antenna module 21 are guided by the recess portions 31a of the selection circuit module 31 already mounted on the mobile device body 1, and hence the selection antenna module 21 can be easily mounted on the mobile device body 1.

According to the first embodiment, the speaker 1a outputting the error sound when the selection antenna module 21 and the selection circuit module 31 are not matched to each other is provided, whereby a user can reliably recognize aurally that the selection antenna module 21 and the selection circuit module 31 are not matched to each other.

Second Embodiment

Next, a mobile phone 200 according to a second embodiment of the present invention is described with reference to FIGS. 6 to 9. According to the second embodiment, a recess portion 202a is provided on each of antenna modules 202 as the first engaging portion of the present invention, and a plunger 20 is provided in a mobile device body 201 as the second engaging portion of the present invention, dissimilarly to the aforementioned first embodiment. The mobile phone 200 is an example of the "mobile device" in the present invention.

Figure 6:
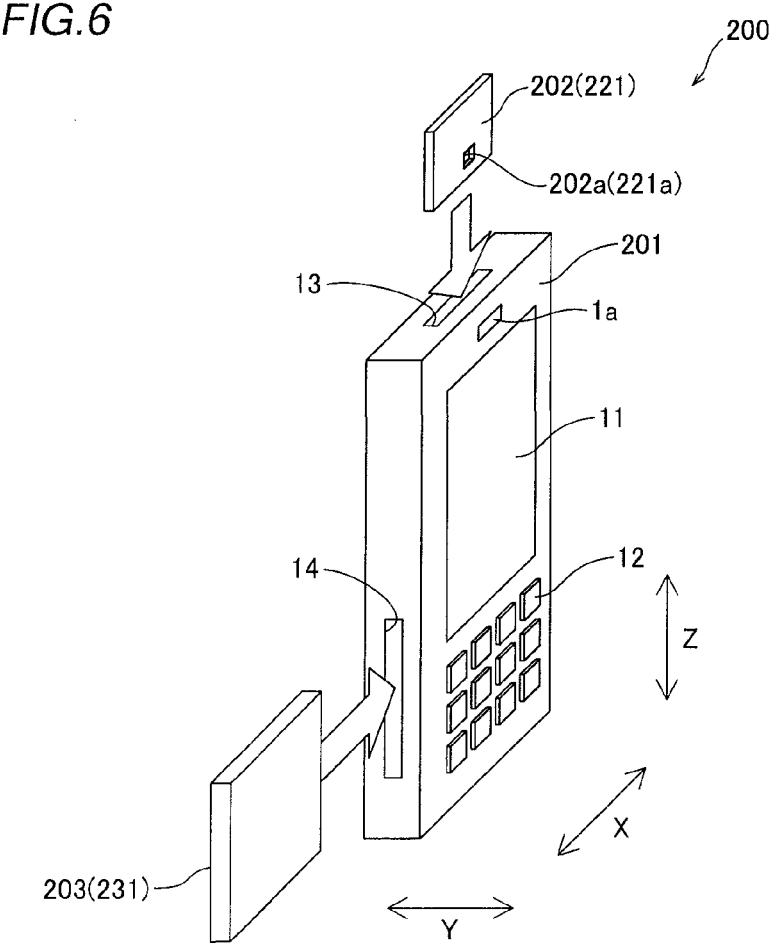
FIG. 6 is a perspective view showing the overall structure of a mobile phone according to a second embodiment of the present invention.

The mobile phone 200 according to the second embodiment comprises the mobile device body 201, a single selection antenna module 221 selected from a plurality of the antenna modules 202 corresponding to a plurality of radio systems (GSM, 3G and WiMAX, for example) and a single selection circuit module 231 selected from a plurality of circuit modules 203 corresponding to a plurality of radio systems (GSM, 3G and WiMAX, for example) as shown in FIG. 6. The mobile phone 200 is mounted with a combination of the selection antenna module 221 and the selection circuit module 231 matched to each other in the radio systems, thereby enabling radio communication of a radio system corresponding to the combination. The selection antenna module 221 and the selection circuit module 231 constitute the "radio communication portion of a mobile device" in the present invention.

Figure 7:
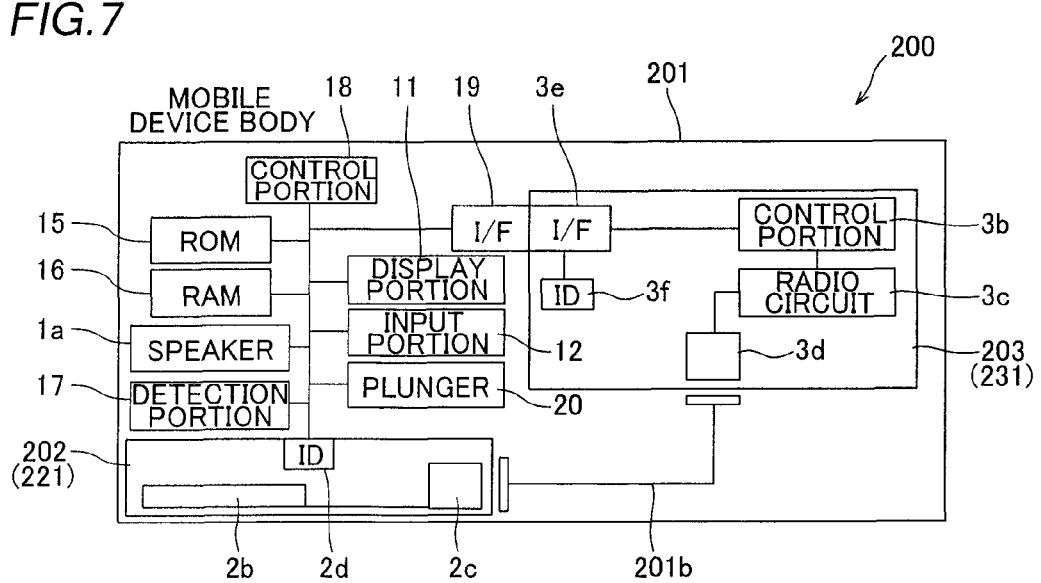
FIG. 7 is a block diagram showing the overall structure of the mobile phone according to the second embodiment of the present invention.

In addition to a ROM 15, a RAM 16, a detection portion 17, a control portion 18 and an interface 19, the plunger 20 is provided in the mobile device body 201, as shown in FIG. 7. The plunger 20 is examples of the "second engaging portion" and "body side engaging portion" in the present invention.

The control portion 18 executes matching determination processing and engagement control processing as described later, when both the selection antenna module 221 and the selection circuit module 231 are inserted into the mobile device body 201.

Figure 8:
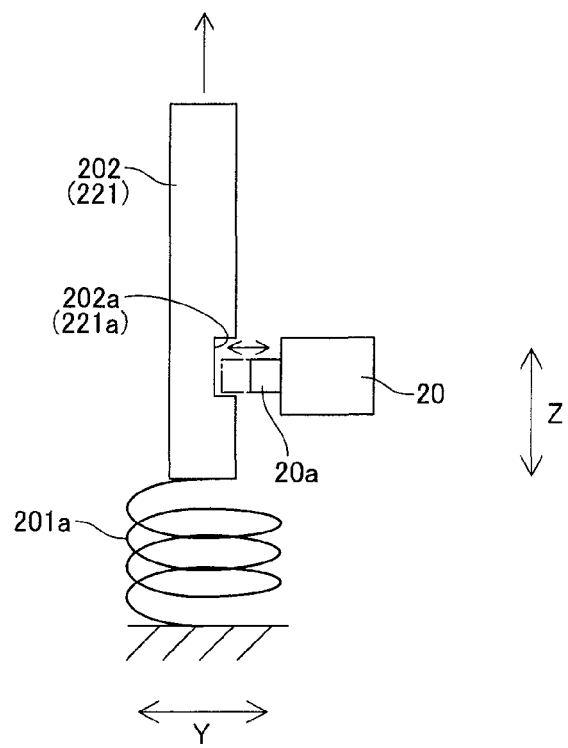
FIG. 8 is a side elevational view for illustrating an engaging state of a selection antenna module of the mobile phone according to the second embodiment of the present invention.

The plunger 20 is formed such that a projecting portion 20a moves linearly in a direction Y by a piston mechanism, as shown in FIG. 8. Specifically, the projecting portion 20a moves in the direction Y thereby coming into engagement or disengagement with a recess portion 221a, described later, of the selection antenna module 221 inserted into the mobile device body 201.

According to the second embodiment, each of the antenna modules 202 (selection antenna module 221) does not have projecting portions 2a each formed in a specified shape corresponding to the radio system but has the recess portion 202a (221a) formed in a common shape on a front surface thereof, dissimilarly to the first embodiment.

The recess portion 202a (221a) has a rectangular shape. The recess portion 202a (221a) is arranged at a position opposed to the projecting portion 20a of the plunger 20 in a state of inserting one of the antenna modules 202 (selection antenna module 221) into the mobile device body 201. The recess portion 202a (221a) is an example of the "first engaging portion" in the present invention.

Each of the antenna modules 202 (selection antenna module 221) is urged in a direction (upward direction) opposite to an insertion direction (downward direction) by a pushing-out portion 201a constituted by a spring, provided in the mobile device body 201 when being inserted into the mobile device body 201 from a receiving portion 13, as shown in FIG. 8. In addition to an antenna element 2b and a coupling terminal 2c, a ROM 2d is provided in each of the antenna modules 202 (selection antenna module 221). The ROM 2d stores ID information indicating which of the radio systems each of the antenna modules 202 (selection antenna module 221) corresponds to.

Each of the circuit modules 203 (selection circuit module 231) does not have recess portions 3a each formed in a specified shape corresponding to one of the radio systems, dissimilarly to the aforementioned first embodiment. In addition to a control portion 3b, a radio circuit 3c, a coupling terminal 3d and an interface 3e, a ROM 3f is provided in each of the circuit modules 203 (selection circuit module 231). The ROM 3*f* stores ID information indicating which of the radio systems each of the circuit modules 203 (selection circuit module 231) corresponds to.

The selection antenna module 221 and the selection circuit module 231 mounted on the mobile device body 201 are so formed as to be electrostatically coupled to each other through a cable 201*b* provided in the mobile device body 201. The selection antenna module 221 and the selection circuit module 231 can be electrostatically coupled to each other by using this cable 201*b* also when a distance between the selection antenna module 221 and the selection circuit module 231 after mounting is large. Thus, flexibility of arrangement of the selection antenna module 221 can be further improved.

The matching determination processing and the engagement control processing executed by the control portion 18 of the mobile phone 200 are now described with reference to FIG. 9.

When inserting both the selection antenna module 221 and the selection circuit module 231 into the mobile device body 201, the matching determination processing and the engagement control processing are executed by the control portion 18 of the mobile phone 200 according to the second embodiment. The control portion 18 acquires the ID information from the ROM 2*d* of the selection antenna module 221 and also from the ROM 3*f* of the selection circuit module 231 at a step S1. The control portion 18 determines whether or not the ID information has been acquired from both the selection antenna module 221 and the selection circuit module 231 at a step S2, and the steps S1 and S2 are repeated until the ID information is acquired from both. After acquiring the ID information from both the selection antenna module 221 and the selection circuit module 231, the control portion 18 determines whether or not a combination of the selection antenna module 221 and the selection circuit module 231 is a matching combination in the radio systems on the basis of acquired two types of the ID information at a step S3. The control portion 18 is an example of the "control portion" in the present invention.

When the selection antenna module 221 and the selection circuit module 231 are matched to each other, the control portion 18 moves the projecting portion 20*a* of the plunger 20 to a position where the projecting portion 20*a* engages with the recess portion 221*a* so that the recess portion 221*a* of the selection antenna module 221 and the projecting portion 20*a* of the plunger 20 come into engagement with each other at a step S4. Specifically, the projecting portion 20*a* of the plunger 20 is moved toward the selection antenna module 221 by the control portion 18, whereby the recess portion 221*a* of the selection antenna module 221 and the projecting portion 20*a* of the plunger 20 are engaged with each other. Thus, the selection antenna module 221 resists urging force in the upward direction generated by the pushing-out portion 201*a* and is mounted on the mobile device body 201.

When the selection antenna module 221 and the selection circuit module 231 are not matched to each other, on the other hand, the control portion 18 moves the projecting portion 20*a* of the plunger 20 to a position where the projecting portion 20*a* does not engage with the recess portion 221*a* so that the recess portion 221*a* of the selection antenna module 221 and the projecting portion 20*a* of the plunger 20 come into disengagement with each other at a step S5. Specifically, the projecting portion 20*a* of the plunger 20 is moved to separate from the selection antenna module 221 by the control portion 18, whereby the recess portion 221*a* of the selection antenna module 221 and the projecting portion 20*a* of the plunger 20 are not engaged with each other. Thus, the selection antenna module 221 cannot resist the urging force in the upward direction generated by the pushing-out portion 201*a* and is pushed out from the mobile device body 201. In other words, the selection antenna module 221 is mounted on the mobile device body 201 when the selection antenna module 221 and the selection circuit module 231 are matched to each other, whereas the selection antenna module 221 is not mounted on the mobile device body 201 when the selection antenna module 221 and the selection circuit module 231 are not matched to each other. The selection circuit module 231 is mounted on the mobile device body 201 by being inserted from a receiving portion 14 in a case of corresponding to any of the radio systems.

The remaining structure of the second embodiment is similar to that of the aforementioned first embodiment.

According to the second embodiment, as hereinabove described, the control portion 18 which determines whether or not the selection antenna module 221 and the selection circuit module 231 are matched to each other on the basis of the ID information, and controls the projecting portion 20*a* to move to a position where the recess portion 221*a* of the selection antenna module 221 and the projecting portion 20*a* of the plunger 20 do not engage with each other when determining that the selection antenna module 221 and the selection circuit module 231 are not matched to each other and move to a position where the recess portion 221*a* and the projecting portion 20*a* engage with each other when determining that the selection antenna module 221 and the selection circuit module 231 are matched to each other is provided, whereby an engaging state/a disengaging state between the recess portion 221*a* of the selection antenna module 221 and the projecting portion 20*a* of the plunger 20 can be easily switched by the control portion 18. Thus, the selection antenna module 221 can be easily switched to be mounted or not to be mounted on the mobile device body 201.

According to the second embodiment, the ROM 2*d* storing the ID information about which of the plurality of radio communication standards the selection antenna module 221 corresponds to and the ROM 3*f* storing the ID information about which of the plurality of radio communication standards the selection circuit module 231 corresponds to are provided in the selection antenna module 221 and the selection circuit module 231, respectively, and the control portion 18 is so formed as to determine whether or not the selection antenna module 221 and the selection circuit module 231 are matched to each other on the basis of the ID information of the selection antenna module 221 and the selection circuit module 231, whereby it is not necessary to acquire characteristics of each of the selection antenna module 221 and the selection circuit module 231 using a measuring instrument or the like, and whether or not the selection antenna module 221 and the selection circuit module 231 are matched to each other can be easily determined on the basis of the ID information by the control portion 18.

According to the second embodiment, the projecting portion 20*a* capable of moving by a piston mechanism is provided and the control portion 18 is so formed as to control the projecting portion 20*a* to be inserted into the recess portion 221*a* of the selection antenna module 221 by moving the same to be engaged with the recess portion 221*a* when the selection antenna module 221 and the selection circuit module 231 are matched to each other, whereby the projecting portion 20*a* and the recess portion 221*a* of the selection antenna module 221 can be easily engaged with each other by moving the projecting portion 20*a* by the control portion 18 when the selection antenna module 221 and the selection circuit module 231 are matched to each other.

According to the second embodiment, the pushing-out portion 201a urging the selection antenna module 221 in a discharging direction from the mobile device body 201 is provided in the mobile device body 201 and the selection antenna module 221 is so formed as to be moved in the discharging direction from the mobile device body 201 by the urging force generated by the pushing-out portion 201a when the recess portion 221a and the projecting portion 20a are not engaged with each other, whereby when the selection antenna module 221 and the selection circuit module 231 are not matched to each other, the selection antenna module 221 is discharged from the mobile device body 201 by the pushing-out portion 201a, and hence a combination of the selection antenna module 221 and the selection circuit module 231 not matched to each other can be reliably prevented from being mounted on the mobile device body 201.

According to the second embodiment, the pushing-out portion 201a is constituted by a spring, whereby the selection antenna module 221 can be easily discharged from the mobile device body 201 using a spring having a simple structure when the selection antenna module 221 and the selection circuit module 231 are not matched to each other.

The remaining effects of the second embodiment are similar to those of the aforementioned first embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while each of the aforementioned first and second embodiments is applied to the mobile phone as an exemplary mobile device, the present invention is not restricted to this. The present invention may alternatively be applied to another mobile device other than the mobile phone such as a PDA (Personal Digital Assistant) or a compact notebook computer.

While the plurality of antenna modules correspond to the plurality of radio systems such as GSM, 3G and WiMAX (an example of a radio communication standard) and the plurality of circuit modules correspond to the plurality of radio systems such as GSM, 3G and WiMAX in each of the aforementioned first and second embodiments, the present invention is not restricted to this. In the present invention, the plurality of antenna modules may alternatively correspond to different frequencies (another example of a radio communication standard) and the plurality of circuit modules may alternatively correspond to different frequencies.

While each of the antenna modules and each of the circuit modules correspond to a single radio system in each of the aforementioned first and second embodiments, the present invention is not restricted to this. In the present invention, each of the antenna modules and each of the circuit modules may alternatively correspond to a plurality of radio systems, or some of the antenna modules and some of the circuit modules may correspond to a single radio system and the remaining antenna modules and the remaining circuit modules may correspond to a plurality of radio systems.

While the selection antenna module is not allowed to be mounted on the mobile device body when the selection antenna module and the selection circuit module are not matched to each other in each of the aforementioned first and second embodiments, the present invention is not restricted to this. In the present invention, the selection circuit module or both the selection antenna module and the selection circuit module may not be allowed to be mounted on the mobile device body when the selection antenna module and the selection circuit module are not matched to each other.

While each of the projecting portions and each of the recess portions are provided as examples of the antenna side engaging portion and the circuit side engaging portion, respectively in the aforementioned first embodiment, the present invention is not restricted to this. In the present invention, each of the antenna side engaging portion and the circuit side engaging portion may alternatively be an engaging portion formed in a comb shape, for example. Alternatively, one of either the antenna side engaging portion or the circuit side engaging portion is formed in a hole shape, and the other of either the antenna side engaging portion or the circuit side engaging portion is formed in a bar shape, whereby the engaging portion formed in a bar shape may be inserted into the engaging portion formed in a hole shape to be engaged therewith. Alternatively, a recess portion is provided on each of the antenna modules as the antenna side engaging portion and a plunger is provided on each of the circuit modules as the circuit side engaging portion, whereby the plunger may be moved to be engaged with the recess portion when the selection antenna module and the selection circuit module are matched to each other.

While the selection antenna module is inserted into the mobile device body after mounting the selection circuit module on the mobile device body in the aforementioned first embodiment, the present invention is not restricted to this. In the present invention, the selection circuit module may alternatively be inserted into the mobile device body after mounting the selection antenna module on the mobile device body. In this case, each of the projecting portions provided as the first engaging portion and each of the recess portions provided as the second engaging portion are so formed as to extend in a direction X (insertion direction of the selection circuit module).

While a user is notified by the error sound that a combination of the selection antenna module and the selection circuit module is not a matching combination in the radio systems in each of the aforementioned first and second embodiments, the present invention is not restricted to this. In the present invention, the mobile device may alternatively be so formed as to notify a user that a combination of the selection antenna module and the selection circuit module is not a matching combination in the radio systems by displaying an error screen including a message that a combination of the selection antenna module and the selection circuit module is not a matching combination in the radio systems on the display portion, for example, or the mobile device may be so formed as to notify a user of an error by a vibrator.

While the selection antenna module and the selection circuit module are connected through electrostatic coupling enabling transmission of a high-frequency signal when the selection antenna module and the selection circuit module are matched to each other in each of the aforementioned first and second embodiments, the present invention is not restricted to this. In the present invention, the selection antenna module and the selection circuit module may alternatively be connected through magnetic coupling enabling transmission of a high-frequency signal when the selection antenna module and the selection circuit module are matched to each other.

What is claimed is:
1. A mobile device comprising:
a mobile device body;
a single selection antenna module mountable on said mobile device body, selected from a plurality of antenna modules corresponding to a plurality of radio communication standards; and a single selection circuit module mountable on said mobile device body, selected from a plurality of circuit modules corresponding to a plurality of radio communication standards, wherein said mobile device body is mounted with a combination of said selection antenna module and said selection circuit module matched to each other in radio communication standards, thereby enabling radio communication of a radio communication standard corresponding to the combination, and at least either said selection antenna module or said selection circuit module is so formed as to be incapable of being mounted on said mobile device body when said selection antenna module and said selection circuit module are not matched to each other, and both said selection antenna module and said selection circuit module are so formed as to be capable of being mounted on said mobile device body when said selection antenna module and said selection circuit module are matched to each other.

2. The mobile device according to claim 1, wherein one of either said selection antenna module or said selection circuit module is so formed as to be incapable of being mounted on said mobile device body, and the other of either said selection antenna module or said selection circuit module is so formed as to be capable of being mounted on said mobile device body, when said selection antenna module and said selection circuit module are not matched to each other.

3. The mobile device according to claim 1, wherein one of either said selection antenna module or said selection circuit module is not engaged when said selection antenna module and said selection circuit module are not matched to each other and includes a first engaging portion to be engaged when said selection antenna module and said selection circuit module are matched to each other, the mobile device further comprising a second engaging portion engaged with said first engaging portion, wherein at least either said selection antenna module or said selection circuit module is so formed as to be incapable of being mounted on said mobile device body when said first engaging portion and said second engaging portion are not engaged with each other, and both said selection antenna module and said selection circuit module are so formed as to be capable of being mounted on said mobile device body when said first engaging portion and said second engaging portion are engaged with each other.

4. The mobile device according to claim 3, wherein said first engaging portion and said second engaging portion include an antenna side engaging portion provided on said selection antenna module and a circuit side engaging portion provided on said selection circuit module, respectively, said antenna side engaging portion and said circuit side engaging portion are so formed as not to be engaged with each other when said selection antenna module and said selection circuit module are not matched to each other and are so formed as to be engaged with each other when said selection antenna module and said selection circuit module are matched to each other, and at least either said selection antenna module or said selection circuit module is so formed as to be incapable of being mounted on said mobile device body when said antenna side engaging portion and said circuit side engaging portion are not engaged with each other, and both said selection antenna module and said selection circuit module are so formed as to be capable of being mounted on said mobile device body when said antenna side engaging portion and said circuit side engaging portion are engaged with each other.

5. The mobile device according to claim 4, wherein each of said antenna side engaging portion and said circuit side engaging portion has a concavo-convex shape, and when said selection antenna module and said selection circuit module are matched to each other, said antenna side engaging portion and said circuit side engaging portion are engaged with each other by fitting said concavo-convex shape of said antenna side engaging portion and said concavo-convex shape of said circuit side engaging portion into each other.

6. The mobile device according to claim 5, wherein said concavo-convex shape of each of said antenna side engaging portion and said circuit side engaging portion is so formed as to extend in a mounting direction of one of either said selection antenna module or said selection circuit module with respect to said mobile device body, and said antenna side engaging portion and said circuit side engaging portion are so formed that said concavo-convex shape of one of either said antenna side engaging portion or said circuit side engaging portion is slid in said mounting direction with respect to said concavo-convex shape of the other of either said antenna side engaging portion or said circuit side engaging portion to be fitted into said concavo-convex shape of the other of either said antenna side engaging portion or said circuit side engaging portion when said selection antenna module and said selection circuit module are matched to each other.

7. The mobile device according to claim 6, wherein one of either said selection antenna module or said selection circuit module is so mounted on said mobile device body that said concavo-convex shape of one of either said antenna side engaging portion or said circuit side engaging portion is slid with respect to said concavo-convex shape of the other of either said antenna side engaging portion or said circuit side engaging portion to be fitted into said concavo-convex shape of the other of either said antenna side engaging portion or said circuit side engaging portion in a state of mounting the other of either said selection antenna module or said selection circuit module on said mobile device body when said selection antenna module and said selection circuit module are matched to each other.

8. The mobile device according to claim 3, wherein said second engaging portion includes a body side engaging portion provided in said mobile device body, the mobile device further comprising a control portion determining whether or not said selection antenna module and said selection circuit module are matched to each other, and controlling said body side engaging portion to move to a position where said first engaging portion and said body side engaging portion do not engage with each other when determining that said selection antenna module and said selection circuit module are not matched to each other and move to a position where said first engaging portion and said body side engaging portion engage with each other when determining that said selection antenna module and said selection circuit module are matched to each other, wherein at least either said selection antenna module or said selection circuit module is so formed as to be incapable of being mounted on said mobile device body when said first engaging portion and said body side engaging portion are not engaged with each other, and both said selection antenna module and said selection circuit module are so formed as to be capable of being mounted on said mobile device body when said first engaging portion and said body side engaging portion are engaged with each other.

9. The mobile device according to claim 8, wherein
said selection antenna module includes a storage portion storing identification information about which of said plurality of radio communication standards said selection antenna module corresponds to and said selection circuit module includes a storage portion storing identification information about which of said plurality of radio communication standards said selection circuit module corresponds to, and
said control portion is so formed as to determine whether or not said selection antenna module and said selection circuit module are matched to each other on the basis of said identification information of said selection antenna module and said selection circuit module.

10. The mobile device according to claim 8, wherein
said first engaging portion includes a recess portion provided on either said selection antenna module or said selection circuit module,
said body side engaging portion includes a projecting portion capable of moving by a piston mechanism, and
said control portion is so formed as to control said projecting portion to be inserted into said recess portion of either said selection antenna module or said selection circuit module by moving the projecting portion to be engaged with said recess portion when said selection antenna module and said selection circuit module are matched to each other.

11. The mobile device according to claim 10, wherein
said mobile device body includes an urging member urging at least either said selection antenna module or said selection circuit module in a discharging direction from said mobile device body, and
at least either said selection antenna module or said selection circuit module is so formed as to be moved in said discharging direction from said mobile device body by urging force generated by said urging member when said first engaging portion and said body side engaging portion are not engaged with each other.

12. The mobile device according to claim 11, wherein
said urging member is a spring member.

13. The mobile device according to claim 1, wherein
said selection antenna module and said selection circuit module are so formed as to transmit a high-frequency signal to each other without contact when said selection antenna module and said selection circuit module are matched to each other.

14. The mobile device according to claim 1, further comprising:
a detection portion detecting that either said selection antenna module or said selection circuit module is not mounted on said mobile device body; and
a notification portion notifying that a combination of said selection antenna module and said selection circuit module is not a matching combination when said detection portion detects that either said selection antenna module or said selection circuit module is not mounted.

15. The mobile device according to claim 14, wherein
said notification portion includes a speaker outputting an error sound when said selection antenna module and said selection circuit module are not matched to each other.

16. A radio communication portion of a mobile device comprising:
a single selection antenna module mountable on a mobile device body, selected from a plurality of antenna modules corresponding to a plurality of radio communication standards; and
a single selection circuit module mountable on said mobile device body, selected from a plurality of circuit modules corresponding to a plurality of radio communication standards, wherein
a combination of said selection antenna module and said selection circuit module matched to each other in radio communication standards is mounted on said mobile device body, thereby enabling radio communication of a radio communication standard corresponding to the combination mounted on said mobile device body, and
at least either said selection antenna module or said selection circuit module is so formed as to be incapable of being mounted on said mobile device body when said selection antenna module and said selection circuit module are not matched to each other, and both said selection antenna module and said selection circuit module are so formed as to be capable of being mounted on said mobile device body when said selection antenna module and said selection circuit module are matched to each other.

17. The radio communication portion of a mobile device according to claim 16, wherein
one of either said selection antenna module or said selection circuit module is not engaged when said selection antenna module and said selection circuit module are not matched to each other and includes a first engaging portion to be engaged when said selection antenna module and said selection circuit module are matched to each other,
the radio communication portion of a mobile device further comprising a second engaging portion engaged with said first engaging portion, wherein
at least either said selection antenna module or said selection circuit module is so formed as to be incapable of being mounted on said mobile device body when said first engaging portion and said second engaging portion are not engaged with each other, and both said selection antenna module and said selection circuit module are so formed as to be capable of being mounted on said mobile device body when said first engaging portion and said second engaging portion are engaged with each other.

18. The radio communication portion of a mobile device according to claim 17, wherein
said first engaging portion and said second engaging portion include an antenna side engaging portion provided on said selection antenna module and a circuit side engaging portion provided on said selection circuit module, respectively,
said antenna side engaging portion and said circuit side engaging portion are so formed as not to be engaged with each other when said selection antenna module and said selection circuit module are not matched to each other and are so formed as to be engaged with each other when said selection antenna module and said selection circuit module are matched to each other, and
at least either said selection antenna module or said selection circuit module is so formed as to be incapable of being mounted on said mobile device body when said antenna side engaging portion and said circuit side engaging portion are not engaged with each other, and both said selection antenna module and said selection circuit module are so formed as to be capable of being mounted on said mobile device body when said antenna side engaging portion and said circuit side engaging portion are engaged with each other.

19. The radio communication portion of a mobile device according to claim 17, wherein said mobile device body is provided with a body side engaging portion as said second engaging portion and a control portion determining whether or not said selection antenna module and said selection circuit module are matched to each other and controlling said body side engaging portion to move to a position where said first engaging portion and said body side engaging portion do not engage with each other when determining that said selection antenna module and said selection circuit module are not matched to each other and move to a position where said first engaging portion and said body side engaging portion engage with each other when determining that said selection antenna module and said selection circuit module are matched to each other, and at least either said selection antenna module or said selection circuit module is so formed as to be incapable of being mounted on said mobile device body when said first engaging portion and said body side engaging portion are not engaged with each other, and both said selection antenna module and said selection circuit module are so formed as to be capable of being mounted on said mobile device body when said first engaging portion and said body side engaging portion are engaged with each other.

20. The radio communication portion of a mobile device according to claim 16, wherein said selection antenna module and said selection circuit module are so formed as to transmit a high-frequency signal to each other without contact when said selection antenna module and said selection circuit module are matched to each other.

* * * * *